(12) United States Patent
Jacas-Miret et al.

(10) Patent No.: US 7,560,827 B2
(45) Date of Patent: Jul. 14, 2009

(54) REMOVABLE SEAT SENSING SYSTEM

(75) Inventors: Josep Jacas-Miret, Valls (ES); Alberto Garcia-Briz, Valls (ES)

(73) Assignee: Lear Corporation, Southfield, MI (US)

( * ) Notice: Subject to any disclaimer, the term of this patent is extended or adjusted under 35 U.S.C. 154(b) by 304 days.

(21) Appl. No.: 11/554,714

(22) Filed: Oct. 31, 2006

(65) Prior Publication Data

US 2008/0100980 A1    May 1, 2008

(51) Int. Cl.
    *B60L 1/00*    (2006.01)
(52) U.S. Cl. ...................................... 307/9.1
(58) Field of Classification Search .................. 307/9.1
    See application file for complete search history.

(56) References Cited

U.S. PATENT DOCUMENTS

| | | | |
|---|---|---|---|
| 4,334,428 A | 6/1982 | Fima et al. |
| 4,578,992 A | 4/1986 | Galasko et al. |
| 5,515,933 A | 5/1996 | Meyer et al. |
| 5,610,856 A | 3/1997 | Yoshizumi et al. |
| 5,618,056 A | 4/1997 | Schoos et al. |
| 5,696,409 A | 12/1997 | Handman et al. |
| 5,804,887 A | 9/1998 | Holzapfel et al. |
| 5,838,233 A | 11/1998 | Hawes et al. |
| 5,851,026 A | 12/1998 | Schoos et al. |
| 5,887,894 A | 3/1999 | Castagner et al. |
| 5,890,779 A | 4/1999 | Blackburn et al. |
| 5,970,587 A | 10/1999 | Knox |
| 6,008,547 A | 12/1999 | Dobler et al. |
| 6,278,347 B1 | 8/2001 | Hofelsauer |
| 6,362,732 B1 | 3/2002 | Konchin et al. |
| 6,400,259 B1 | 6/2002 | Bourcart et al. |
| 6,424,055 B1 | 7/2002 | Hambsch et al. |
| 6,485,080 B2 | 11/2002 | Hansen et al. |
| 6,772,056 B2 | 8/2004 | Mattes et al. |
| 6,800,958 B1 | 10/2004 | Baer et al. |
| 6,856,244 B2 | 2/2005 | Jung et al. |
| 6,868,734 B2 | 3/2005 | Jakoby et al. |
| 6,882,162 B2 | 4/2005 | Schirmer et al. |
| 7,170,192 B2 | 1/2007 | Kazmierczak |
| 7,271,501 B2 | 9/2007 | Dukart et al. |
| 2003/0066702 A1 | 4/2003 | Jung et al. |
| 2004/0008036 A1 | 1/2004 | Schirmer et al. |
| 2005/0150705 A1 | 7/2005 | Vincent et al. |

(Continued)

FOREIGN PATENT DOCUMENTS

AU    2003217092 A1    9/2003

(Continued)

OTHER PUBLICATIONS

Great Britain Search and Examination Report for corresponding Application No. GB0720774.9, mailed Feb. 25, 2008, 7 pages.

*Primary Examiner*—Robert L. DeBeradinis
(74) *Attorney, Agent, or Firm*—Brooks Kushman P.C.

(57) ABSTRACT

The present invention relates to removable seating systems of the type wherein all or part of a seat may be removed or otherwise disengaged from a secure connection location, such as but not limited to vehicle seats that me be removed or disengage for folding from a vehicle mounted seat frame assembly. The system may include coupling circuits to facilitate assess states of a switch included on the removable seat.

20 Claims, 3 Drawing Sheets

U.S. PATENT DOCUMENTS

| | | | |
|---|---|---|---|
| 2005/0236899 | A1 | 10/2005 | Kazmierczak |
| 2007/0070951 | A1 | 3/2007 | Ocket et al. |
| 2007/0090967 | A1 | 4/2007 | Zuccotti et al. |
| 2007/0102999 | A1 * | 5/2007 | Darraba .................... 307/10.1 |

FOREIGN PATENT DOCUMENTS

| | | | |
|---|---|---|---|
| CN | 1816464 A | | 8/2006 |
| DE | 40006885 A1 | | 10/1990 |
| DE | 19743313 C1 | | 12/1998 |
| DE | 19938281 T1 | | 5/2001 |
| DE | 10037260 A1 | | 3/2002 |
| DE | 10164068 A1 | | 4/2003 |
| DE | 10239754 C1 | | 10/2003 |
| DE | 10245783 | | 4/2004 |
| EP | 1019263 B1 | | 11/2001 |
| EP | 1549530 B1 | | 8/2006 |
| EP | 0819072 B2 | | 7/2007 |
| EP | 1808339 A1 | | 7/2007 |
| EP | 1622790 B1 | | 2/2008 |
| FR | 2758502 A1 | | 7/1998 |
| FR | 2884185 A1 | | 10/2006 |
| FR | 2888538 A1 | | 1/2007 |
| FR | 2889341 A1 | | 2/2007 |
| FR | 2893289 A1 | | 5/2007 |
| FR | 2899538 A1 | | 10/2007 |
| GB | 1301359 | | 12/1972 |
| GB | 2195183 A | | 3/1988 |
| GB | 2299550 A | | 10/1996 |
| GB | 2337335 A | | 11/1999 |
| GB | 2338262 A | | 12/1999 |
| GB | 2383879 A | | 7/2003 |
| GB | 2385630 A | | 8/2003 |
| GB | 2401467 A | | 11/2004 |
| GB | 2410977 A | | 8/2005 |
| GB | 2401467 B | | 1/2006 |
| JP | 2006526529 A | | 11/2006 |
| KR | 20060009919 A | | 2/2006 |
| WO | 9631370 A1 | | 10/1996 |
| WO | 9916637 A1 | | 4/1999 |
| WO | 9963851 A1 | | 12/1999 |
| WO | 03024749 A1 | | 3/2003 |
| WO | 03070530 A1 | | 8/2003 |
| WO | 2004032088 A1 | | 4/2004 |
| WO | 2004098943 A1 | | 11/2004 |
| WO | 2006059020 A1 | | 6/2006 |
| WO | 2006108954 A2 | | 10/2006 |
| WO | 2007007009 A2 | | 1/2007 |
| WO | 2007113632 A3 | | 10/2007 |

* cited by examiner

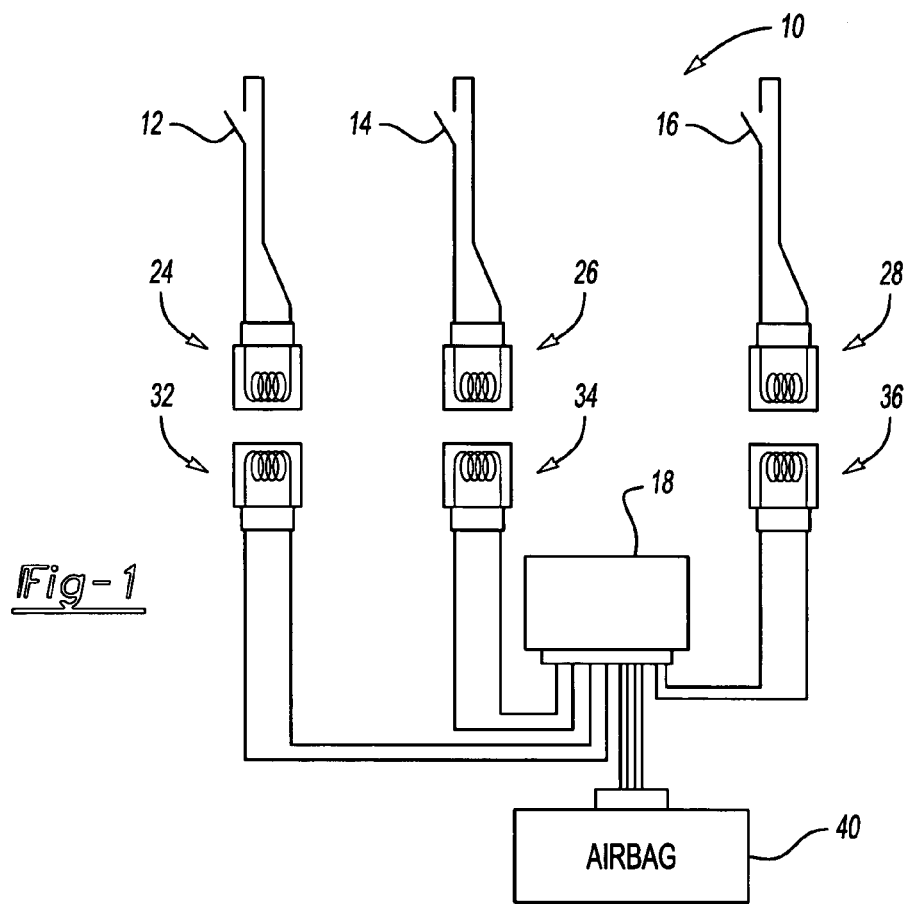
*Fig-1*
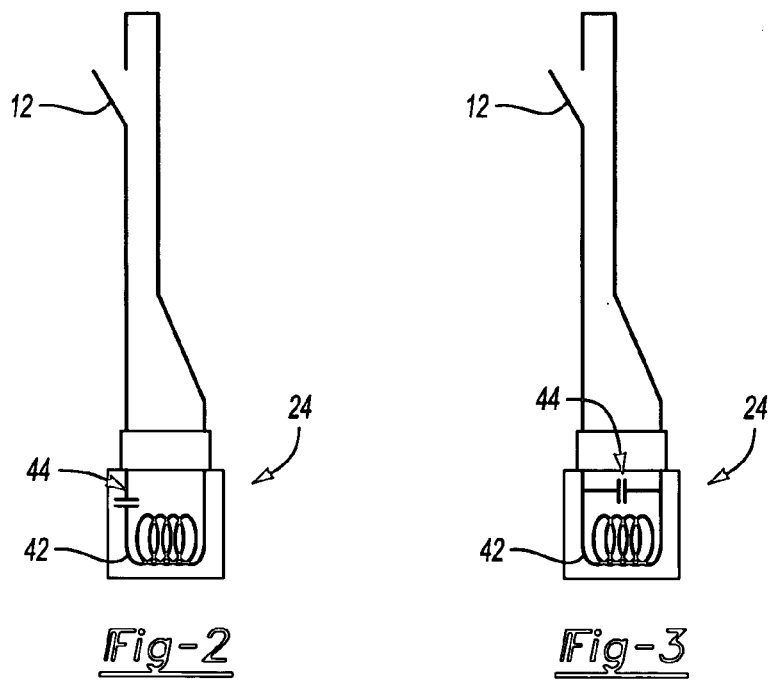
*Fig-2*  *Fig-3*

REMOVABLE SEAT SENSING SYSTEM

BACKGROUND OF THE INVENTION

1. Field of the Invention

The present invention relates to removable seating systems of the type wherein all or part of a seat may be removed or otherwise disengaged from a secure connection location, such as but not limited to vehicle seats that me be removed or disengage for folding from a vehicle mounted seat frame assembly.

2. Background Art

The present invention relates to removable seating systems of the type wherein all or part of a seat may be removed or otherwise disengaged from a secure connection location, such as but not limited to vehicle seats that me be removed or disengage for folding from a vehicle mounted seat frame assembly. Such systems may include removable, movable or foldable (hide able) seat bottoms and backs.

The need for monitoring some variables in the seat (seatbelt buckle, occupancy sensor, seat anchoring to body platform . . . ) may require a logical link (and even a power connection) between seat and vehicle chassis. However, the use of physical connection for an electric circuit is not recommended due to possible quality problems appearing from the limited mating-life of connectors that would lead to malfunction after a few assemblies and disassemblies of the seats.

Furthermore, the need for manual mating of these connectors transfers the responsibility to the end user (driver or passenger), which may not be desired by the OEM. Some self-aligning connectors have been developed to avoid user participation, but these self-matching devices may still have the problem of the limited number of mating—un-mating actions.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a seating system in accordance with one non-limiting aspect of the present invention;

FIG. 2 illustrates a seat coupling circuit in accordance with one non-limiting aspect of the present invention;

FIG. 3 illustrates a seat coupling circuit in accordance with one non-limiting aspect of the present invention;

DETAILED DESCRIPTION OF THE PREFERRED EMBODIMENT(S)

Figure 4:
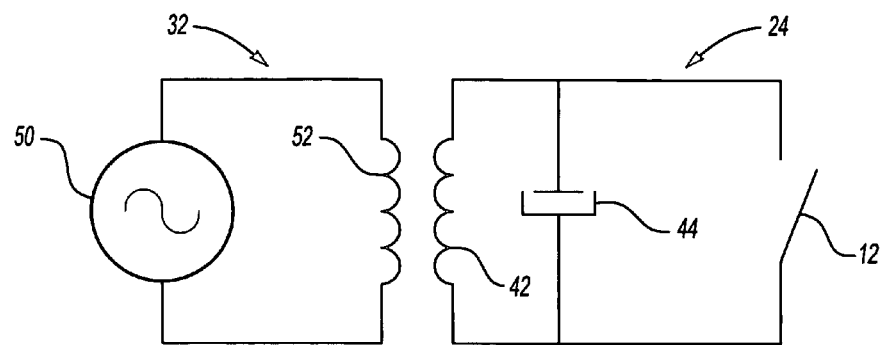
FIG. 4 illustrates coupling between circuits in accordance with one non-limiting aspect of the present invention.

FIG. 1 illustrates a seating system 10 in accordance with one non-limiting aspect of the present invention. The system 10 may relate to vehicle or non-vehicle systems wherein a seating system includes a removable seat or seat having a removable portion (not shown) such that the removable portion may be removed or otherwise disengaged from a support element or other element characterized as being a non-removable seat portion, such as but not limited to an element associated with supporting the removable seat.

The system 10 generally relates to facilitating wireless communication between the removable seat and non-removable seat portion. For exemplary purposes only and without intending to limit the scope and contemplation of the present invention, the system is described with respect to a vehicle having a removable seat and vehicle chassis used to support and/or electrically communication with the seat so as to facilitate electrical communications between the removable and non-removable portions. The present invention fully contemplates its use in any number of environments and is not intended to be limited to the foregoing going.

The system 10 illustrated in FIG. 1 includes a number of switches 12-16 associated with one or more removable seats and a fixed controller 18 mounted to a vehicle floor or other element in the vehicle. The controller 18 may be configured to determine an activation state of the switches 12-16 as a function of an electrical coupling between seat coupling circuits 24-28 associated with the switches 12-16 and corresponding vehicle coupling circuits 32-36 associated with the controller 18.

As described below in more detail, electrical transmission between the coupled circuits 24-36 may be used to sense and/or otherwise assess various seating parameters of the corresponding seat. The electric transmission may be limited to resonance based transmission commonly associated with a transformer, tuned inductance, or other similar arrangement. Optionally, the communication may relate only to resonant based influences without the communication of data or other information.

The switches 12-16 may be associated with any number of sensors or other features included on one or more seats. For example, the switches 12-16 may be associated with belt buckle locks commonly used to lock a seat belt associated with restraining an seat occupant within a vehicle seat. The switches 12-16 may be binary switches having open and closed states such that the open state corresponds with the seat belt being unlocked and the closed state corresponds with the seat being locked.

The controller 18 may assess whether the switches 12-16 are opened or closed as a function of the coupling between the seat and vehicle coupling circuits 24-36. This information may then be communicated to other vehicle systems. FIG. 1 illustrate a airbag control module 40 being in communication with the controller 18. The airbag control module 40 may be configured to control airbag deployment as a function of whether the seat belts are buckled or unbuckled, such as but not limited to preventing airbag deployment for seats having unbuckled seat belts.

Of course, the present invention is not limited to controlling airbag deployment as a function switch state. The coupling signals may be used to facilitate any number of operations. For example, the switch state may be used to facilitate controlling displays and other information to the passenger or elsewhere in the vehicle, such as but not limited to generating a seat belt unlock warning or activating an seat belt unlocked indicator.

FIG. 2 illustrates the seat coupling circuit 24 in accordance with one non-limiting aspect of the present invention. The circuit 24 may include an inductor 42 in series with a capacitor 44 and the switch. The circuit 24 provides resonance when the inductor 42 is exposed to a magnetic field and the switch 12 is closed. The circuit 24 fails to provide resonance when the switch 12 is open, regardless of the presence of a magnetic field. In this manner, the circuit 24 may be characterized as providing binary resonance operation in so far as the circuit provides resonance or no resonance at all, i.e., it has as single resonance. In this manner, the circuit 24 may be used to provide resonance when the switch 12 is closed and no resonance with the switch 12 is open.

FIG. 3 illustrates the seat coupling circuit 24 in accordance with one non-limiting aspect of the present invention. The circuit 24 may include the inductor 42 in parallel with the capacitor 44 and in series with the switch 12. The circuit 24 provides resonance when the inductor 42 is exposed to a magnetic field and the switch 12 is open. The circuit 24 fails to provide resonance when the switch 12 is closed, regardless of the presence of a magnetic field. In this manner, the circuit 24 may be characterized as providing binary resonance operation in so for as the circuit 24 provides resonance or no resonance at all, i.e., it has as single resonance. In this manner, the circuit 24 may be used to provide resonance when the switch 12 is open and no resonance with the switch 12 is closed.

FIG. 4 illustrates one of the vehicle coupling circuits 32 being coupled with one of the seat coupling circuits 24 in accordance with one non-limiting aspect of the present invention. The vehicle coupling circuit 32 may include a signal generator 50 and an inductor 52. The signal generator 50 may operate in conjunction with the inductor 52 to generate the magnetic field associated with coupling the inductor 52 on the vehicle coupling circuit 32 with the inductor 42 of the seat coupling circuit 24, which is shown for exemplary purposes to correspond with the seat coupling circuit shown in FIG. 3.

The controller 18 may be configured to control the signal generated by the signal generator 50 and to perform other operations related thereto. While only one coupling arrangement is shown in FIG. 4, the controller 18 may be used to separately generate signals and monitor corresponding coupling between any number of pairs of vehicle and seat coupling circuits. This allows the present invention to monitor switch state for different types of switches on any number of seats with the vehicle.

Figure 5:
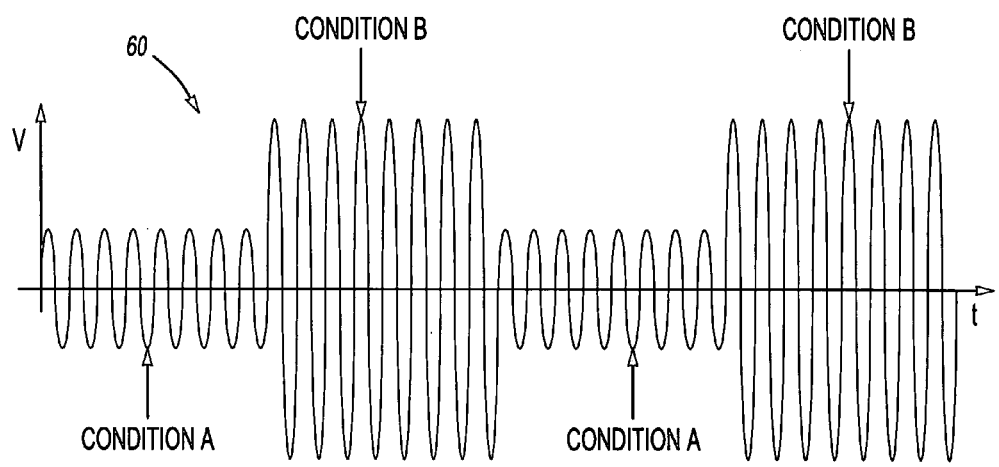
FIG. 5 illustrates a graph of signal variations associated with resonance between coupling circuits.

FIG. 5 illustrates a graph 60 of signal variations associated with resonance between the seat 24 and vehicle coupling circuits 34. The vertical axis corresponds with a voltage at the vehicle inductor 52 and a signal corresponds with the signal associated with the corresponding signal generator and time based variations therein. Condition A corresponds with the absence of resonance and Condition B corresponds with the present of resonance, i.e., coupling. This variation in amplitude may be used to assess switch state as the voltage across the vehicle inductor 52 drops when the circuits are coupled together, i.e., in the present of resonance.

Figure 6:
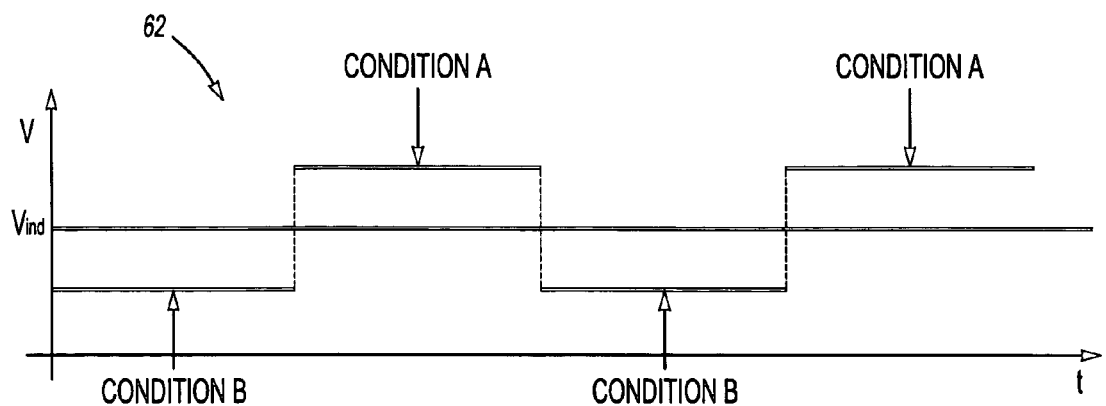
FIG. 6 illustrates a voltage component of the signal variations in accordance with one non-limiting aspect of the present invention.

FIG. 6 illustrates a graph 62 associated with the controller 18 converting the AC signal of FIG. 5 to a DC signal in accordance with one non-limiting aspect of the present invention. This conversion may be done with an inverter or other element (not shown) associated with the controller 18. As shown, distinct voltage based variations occur between condition (no resonance) and condition B (no resonance). Optionally, the controller 18 may include a filter or other similar element to reduce noise and other variance in the signal prior to converting it to the illustrated DC signal.

Figure 7:
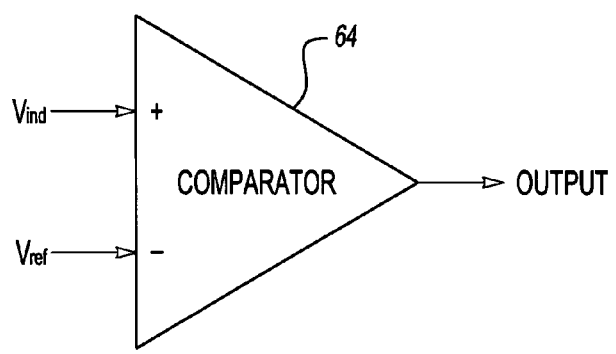
FIG. 7 illustrates a comparator in accordance with one non-limiting aspect of the present invention.

FIG. 7 illustrates a comparator 64 of the controller 18 in accordance with one non-limiting aspect of the present invention. The comparator 68 may receive the DC signal of associated with the voltage variations at the vehicle inductor 52 (Vind) for comparison to a reference voltage (Vref). The comparison may be used to determine the state of the switch 12, depending on the configuration of the seat coupling circuit 24. For example, the seat coupling circuit 24 shown in FIG. 2 is in a closed state when the voltage is less than the reference voltage and in an open state when the voltage is greater than the reference voltage. The seat coupling circuit 24 shown in FIG. 3 is in an open state when the voltage is less than the reference voltage and in a closed state when the voltage is greater than the reference voltage.

An output from the comparator 64 may be communicated to the airbag module 40 for use in controlling airbag deployment, as noted above. Likewise, the controller 18 or other vehicle element may use the output to perform any number of other operations, such as but not limited to generating the seat belt warning, etc. In this manner, the present invention is able to assess switch state and use this information to itself control and/or to facilitate controller other vehicle based systems One non-limiting aspect of the present invention relates to determining switch state as a function voltage variations resulting from the coupling/resonance between two coupling circuits. In this manner, the analysis of the present invention may be advantageously performed without regard to the actual resonance frequency, without requiring multiple resonance frequencies for each state, and without requiring data to be communicated between the coupling circuits.

One non-limiting aspect of the present invention relates to an only-detection system, without any responsibility in the actuation of safety devices (for example, airbag systems). The related system may produce status signals to an external controller for that safety functions.

One non-limiting aspect of the present invention may be considered as a simplified system that produces a cost-effective system without the need of complex electronics, but at the same time without compromising the required system responses, as the proposed invention includes relatively fast reaction times.

One non-limiting aspect of the present invention relates to the use of active components on the vehicle side and passive units being installed on each seat having only transponders that will react to the external excitation signals. Active components in the vehicle side will generate an alternating signal for each seat, with an optional fixed frequency for all of them. Some other active components will be able to read the response from each separate seat, in order to produce the specific message to the external controller module. Detection may be achieved through a single resonant frequency, and thus it is not needed to differentiate between several frequencies or harmonics from a same frequency.

One non-limiting aspect of the present invention relates to a resonant circuit in the seat including an inductor, a mating capacitor (to create resonance at the desired frequency) and the switches to be detected. As a result, behavior should be expected from the system may include: requiring switches or sensors to be naturally closed in the static position (for example, belt not buckled, or occupancy sensor in low impedance); the active position may be considered as an open circuit (belt buckled, occupancy sensor in high impedance); since any of the switches connected in series will trigger the change of status, only two signals may be produced in the first embodiment, i.e., OK and NOT OK; basic response from the opening of the circuit may be the complete elimination of the resonance in the seat side, so that the coupling will disappear.

One non-limiting aspect of the present invention relates to an inductive coupling system to provide remote diagnostic on the status of one or several signals in one or several movable, removable or foldable (hide-able) seats of a motor vehicle, such as but not limited to within a vehicle having a number of independent seats, two or three (second row only) up to six (second and third rows of seats present) seats in a vehicle.

One non-limiting aspect of the present invention relates to a whole system consisting of main module and slave emitters on the vehicle side, and passive transponders on the seat side, which may optionally uses a single frequency for all seats that does not require the use of harmonic frequencies in its function.

One non-limiting aspect of the present invention relates to reporting the switch state to an external module, such as but not limited to detecting status of a seat belt buckle, detecting status of an occupancy sensor, and/or detecting status of a seat locking to the chassis platform, detecting status of a backrest mechanism locking.

One non-limiting aspect of the present invention relates to some parts of the present invention being realized with standard electronic assembly technologies, with metal-fret structures to eliminate the need of circuit boards, and/or with three-dimensional mould-interconnect device (MID) technologies to integrate the electronic components with the required plastic housing.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A removable vehicle seating system for wirelessly sensing activation of a switch included on a removable seat, the system comprising:
    a first coupling circuit on the removable seat configured for resonating as a function of switch activation;
    a second coupling circuit wirelessly coupled with the first coupling circuit; and
    a voltage unit in communication with the second coupling circuit for assessing switch activation as a function of a voltage variation of the second coupling circuit resulting from resonance of the first coupling circuit.

2. The system of claim 1 wherein the voltage unit assess switch activation solely as a function of the voltage variation and without assessing a frequency of the first or second coupling circuits.

3. The system of claim 1 wherein the activation of the switch is characterized by the switch being in either one of an inactive state and an active state, and wherein the first coupling circuit resonates for one but not both of the states.

4. The system of claim 1 wherein the voltage variation only occurs if the first coupling circuit is resonating.

5. The system of claim 1 wherein the first coupling circuit includes an inductor connected in series with a capacitor and the seat switch such that the first coupling circuit only resonates when the seat switch is closed.

6. The system of claim 1 wherein the first coupling circuit includes an inductor connected in parallel with a capacitor and in series with the seat switch such that the first coupling circuit only resonates when the seat switch is open.

7. The system of claim 1 wherein the switch is a seat belt lock having a locked state and an unlocked state and the activation of the switch indicates whether the seat belt is in the unlocked or lock state.

8. The system of claim 7 further comprising an airbag control module in communication with the voltage sensing unit, wherein the air bag control module controls deployment of an air bag as a function of whether the seat belt is in the locked or unlocked state.

9. The system of claim 1 wherein the second coupling circuit radiates a magnetic field used to couple the first and second coupling circuits, wherein the magnetic field radiates at a fundamental frequency and without any harmonics.

10. A method for wirelessly sensing activation of a switch included on a removable seat, the method comprising:
    monitoring a voltage variation of a second coupling circuit wirelessly coupled to a first coupling circuit included on the removable seat, the voltage variation being associated with resonance of the first coupling circuit, wherein the resonance of the first coupling circuit is dependent on an activation state of the switch; and
    determining the activation state of the switch to corresponding with the switch being inactive or active based on the voltage variation.

11. The method of claim 10 further comprising determining the activation state of the switch solely as a function of the voltage variation and without determining a frequency of the first or second coupling circuits.

12. The method of claim 10 further comprising determining the activation state as a function of the first coupling circuit resonating for one but not both of the states.

13. The method of claim 10 further comprising determining the activation state of the switch based on the voltage variation only occurring when the first coupling circuit is resonating.

14. The method of claim 10 resonating the second coupling circuit without harmonics of a frequency at which the first coupling circuit resonates.

15. A vehicle seating system comprising:
    a first coupling circuit on a removable seat, the seat having a seat switch operable between an active state and an inactive state, the first coupling circuit configured to resonate as a function of one but not both of the states;
    a second coupling circuit wirelessly coupled with the first coupling circuit; and
    a unit in communication with the second coupling circuit for assessing switch activation as a function of a voltage variation of the second coupling circuit resulting from resonance of the first coupling circuit.

16. The system of claim 15 wherein the unit assess switch activation solely as a function of the voltage variation and without assessing a frequency of the first or second coupling circuits.

17. The system of claim 15 wherein the voltage variation only occurs if the first coupling circuit is resonating.

18. The system of claim 15 wherein the switch is a seat belt lock having a locked state and an unlocked state and the activation of the switch indicates whether the seat belt is the unlocked or locked state.

19. The system of claim 18 further comprising an airbag control module in communication with the voltage sensing unit wherein the air bag control module controls deployment of an air bag as a function of whether the seat belt is in the locked or unlocked state.

20. The system of claim 15 wherein the first coupling resonance at a single frequency to a single resonance frequency of the second coupling circuit.

* * * * *